(12) United States Patent  
Daniel

(10) Patent No.: US 8,561,969 B2  
(45) Date of Patent: Oct. 22, 2013

(54) DECK HANDRAIL COVER

(75) Inventor: Harry T Daniel, Raleigh, NC (US)

(73) Assignee: Harry T. Daniel, Raleigh, NC (US)

( * ) Notice: Subject to any disclaimer, the term of this patent is extended or adjusted under 35 U.S.C. 154(b) by 66 days.

(21) Appl. No.: 13/103,017

(22) Filed: May 6, 2011

(65) Prior Publication Data

US 2012/0153246 A1 Jun. 21, 2012

Related U.S. Application Data

(60) Provisional application No. 61/459,602, filed on Dec. 16, 2010.

(51) Int. Cl.
E04H 17/14 (2006.01)
(52) U.S. Cl.
USPC .................................. 256/1; 256/19; 256/59
(58) Field of Classification Search
USPC .............. 256/1, 19, 59, 21, DIG. 6; 52/716.1, 52/717.05, 834
See application file for complete search history.

(56) References Cited

U.S. PATENT DOCUMENTS

| 2,821,754 | A | | 2/1958 | Hillson | |
|---|---|---|---|---|---|
| 4,114,860 | A | * | 9/1978 | Parisien | 256/21 |
| 4,359,851 | A | * | 11/1982 | Daniels | 256/59 |
| 4,885,882 | A | | 12/1989 | Forshee | |
| 5,326,187 | A | | 7/1994 | St. Marie et al. | |
| 5,505,517 | A | * | 4/1996 | Groh et al. | 297/219.1 |
| 5,772,185 | A | | 6/1998 | Pulsipher | |
| 5,794,390 | A | | 8/1998 | Oliveri et al. | |
| 6,311,955 | B1 | * | 11/2001 | McGarry et al. | 256/24 |
| 6,453,630 | B1 | | 9/2002 | Buhrts et al. | |
| 6,688,054 | B2 | | 2/2004 | Pasterchick | |
| 6,719,278 | B2 | * | 4/2004 | Bryan | 256/59 |
| 7,441,378 | B2 | | 10/2008 | Wood | |
| 7,673,425 | B2 | * | 3/2010 | Thomas | 52/177 |
| 2009/0145077 | A1 | * | 6/2009 | Castelle | 52/716.2 |
| 2010/0200823 | A1 | * | 8/2010 | Ringus et al. | 256/1 |

* cited by examiner

Primary Examiner — Michael P Ferguson

(57) ABSTRACT

The present invention relates generally to deck handrails, and more particularly to wooden deck handrails. Specifically, the invention relates to a protective deck handrail cover for deteriorating wood deck handrails constructed in most decks and porches exposed to the harsh effects of extreme weather conditions.

6 Claims, 4 Drawing Sheets

DECK HANDRAIL COVER

This application claims priority to provisional application 61/459,602 filed Dec. 16, 2010.

FIELD OF THE INVENTION

The present invention relates generally to deck handrails, and more particularly to wooden deck handrails. Specifically, the invention relates to a protective deck handrail cover for deteriorating wood deck handrails constructed in most decks and porches exposed to the harsh effects of extreme weather conditions.

BACKGROUND OF THE INVENTION

The benefit of wooden decks is well known in the art. The material is plentiful, cheap, and durable. Wooden decks are built in extreme weather areas, such as the coast, due to the cheapness and strength of the wood. Extreme weather conditions of coastal areas cause wooden handrails and decks to deteriorate at a rapid rate. Thus, both residential and business owners of wooden decking are forced to renovate their wooden decks sooner and more frequently than residents and businesses of other environments.

One solution to this problem is to construct decks with composite or plastic planks which are either solid or cored. These products eliminate the problems of long term care of wooden decks; however, the cost may be 2 to 3 times the cost of wood. Due to this solution's higher cost, many residents and commercial owners choose to construct wooden decks due to the cheapness and inherent strength of wood. Thus, the solution of composite or plastic planks fails to meet all of the needs of residential and commercial consumers. It would be highly desirous, to have a lower cost alternative to such plastic planks. One such solution would be a protective deck handrail cover constructed of a plastic material that could cover existing wood deck handrails from extreme weather elements.

Several proposed solutions have been provided in the prior art and will be described below. Even though these solutions may be suitable for the specific individual purposes to which they address; however, they differ from the present invention.

A protective wooden handrail cover is disclosed in U.S. Pat. No. 5,794,390 (the '390 patent) to Oliveri, et al. issued on Aug. 18, 1998 entitled "Structural Covering," the disclosure of which is hereby incorporated by reference. This handrail cover comprises a flat top portion to cover the top of the handrail and two flat side portions fitted perpendicularly to either edge of the flat top portion to thereby cover the sides of the handrail. This cover was innovative for its time, but the design is rigid and the handrail cover fails to "snap-on" for stability and ease of installation.

A protective wooden handrail cover is also disclosed in U.S. Pat. No. 5,326,187 (the '187 patent) to St. Marie, et al. issued on Jul. 5, 1994 and entitled "Cover for a Rail of a Fence", the disclosure of which is herein incorporated by reference. The cover disclosed in this patent possesses a curved top for aesthetic purposes, two flat side portions fitted perpendicularly to either edge of the curved top portion, and two flange portions perpendicular to each flat side portion. Unfortunately, this design can only be used on wooden planks prior to deck construction, as the cover must "slide" onto the plank. Thus, this design cannot be used on existing wooden decks. Even though the curved top of this design is aesthetically pleasing, for coastal and humid regions, mold may grow under the curved portion and increase the rate of deterioration of the wooden planks.

Finally, a recent attempt to design a deck plank cover is disclosed in U.S. Pat. No. 7,441,378 (the '378 patent) to Wood, published Oct. 28, 2008 and entitled "Deck Plank Cover", the disclosure of which is incorporated herein by reference. The cover has the same basic structure as the '390 patent, but adds inwardly angled side portions and wood engaging fillets to adhere to the deck planks without the need for screws, nails, or adhesives. This design is innovative in that the deck plank cover may "snap-on" for ease of installation. However, this design fails to take into consideration the common method of constructing wooden deck handrails, and thus the "engaging fillets" would fail to engage a wooden handrail properly. Also, the design fails to take into consideration the extreme heat and sun the plastic cover itself would endure in coastal and other extreme weather environments.

Thus there is a need for a protective deck handrail cover that can be applied over the handrail of a new or existing wooden deck thereby giving the benefits of a plastic or composite deck, for fraction of the cost.

SUMMARY OF THE INVENTION

The present invention is a plastic deck handrail cover designed to be a solution to deteriorating wood handrails found in most decks and porches exposed to the harsh effects of the outside elements in extreme environments. The present invention may be affixed directly to the surface of existing wooden decks using the natural tension of the plastic material. This would ease installation, enabling the non-professional to install the handrail covering without requiring hiring professional installers. The smooth surface and enclosure on the top and both sides of handrails would eliminate regular maintenance and would maintain the overall like-new appearance of the railing over a long period of time. The present invention would reduce or completely eliminate injuries to children and adults alike from splinters and sharp edges found on deteriorating wood handrails in coastal and extreme weather environments.

Features and advantages of the present invention will become more readily apparent from the detailed description of the preferred embodiments when considered with the attached drawings and appended claims.

DETAILED DESCRIPTION OF THE INVENTION

The present invention is preferably formed from plastic materials, such as polyvinyl chloride, and manufactured by an extrusion process known in the art. The basic shape of the present invention is U-shaped with flanges for stability and securing the deck handrail cover to the wooden handrail. The present invention may possess holes for screws to provide additional stability and for securing the present invention to a wooden deck handrail.

Figure 1:
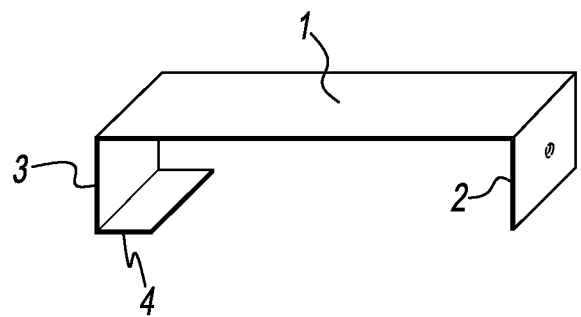
FIG. 1 is a perspective view of the first embodiment of the present invention.

Referring now to FIG. 1, the first embodiment of the present invention is designed to cover a standard 2×4 piece of lumber. The top 1 portion of the first embodiment lays flat up against the wood, as does each of the side portions 2 and 3. The bottom flange 4 of the first embodiment enables the deck cover to "snap-on" to a 2×4 piece of lumber. This is accomplished by slightly bending the plastic handrail cover and "snaping" onto the 2×4 piece of lumber. The width of bottom flange 4 is sized to prevent a user gripping the handrail from coming in contact with possible splintered wood beneath the plastic handrail cover.

When installed in coastal and extreme weather environments, it may be necessary to provide screw holes for additional security to the wooden deck handrail. As stated previously, it is preferred the present invention is composed from plastic materials as they are cheap, flexible, and durable. However, plastic materials over a period of time when exposed to extreme heat and sun may expand or deform. Thus, in an alternative embodiment of the present invention, screw holes may be provided for additional security and to prevent the present invention from separating from the wooden handrail cover it is installed on. The first embodiment of the present invention, as shown in FIG. 1, would preferably have screw holes on side portion 2. In an alternative embodiment, it is also conceived bottom flange 4 could possess screw holes in addition to screw holes on side portion 2. The width of bottom flange 4 would be sized to accommodate a standard sized deck screw.

Figure 2:
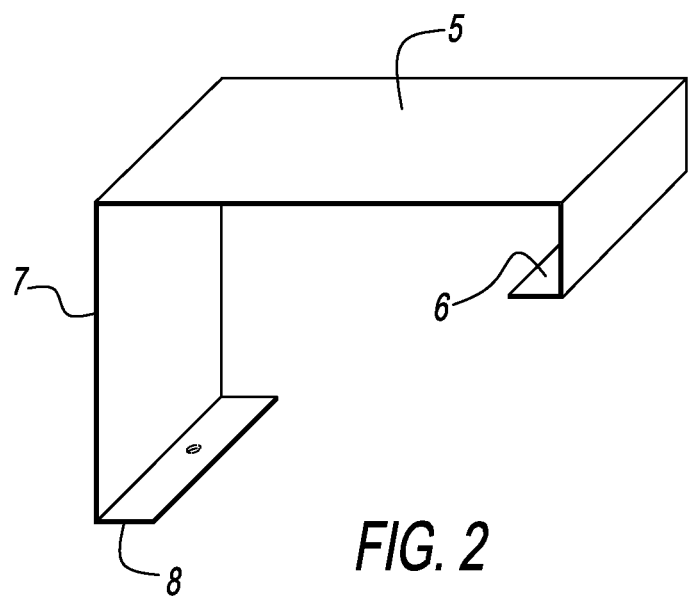
FIG. 2 is a perspective view of the second embodiment of the present invention.
Figure 7:
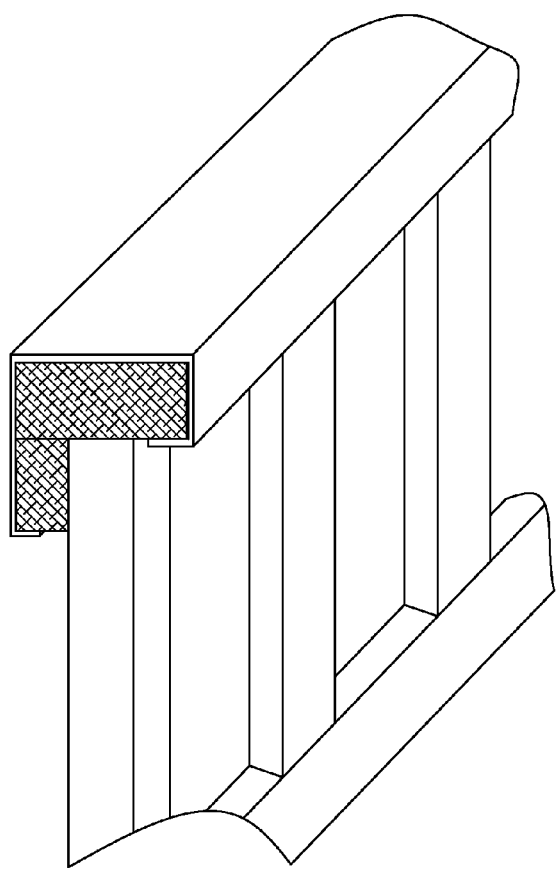
FIG. 7 demonstrates the installation of the second embodiment on a wooden deck handrail.

Referring now to FIG. 2, the second embodiment of the present invention is designed to cover a two standard 2×4 pieces of lumber that are perpendicular in an L-shaped formation (see FIG. 7). The top 5 portion of the second embodiment lays flat up against the wood, as does the side portion 7. The flanges 6 and 8 of the second embodiment enable the deck cover to "snap-on" to the pieces of lumber as in the first embodiment. The widths of flanges 6 and 8 are sized to prevent a user gripping the handrail from coming in contact with possible splintered wood beneath the plastic handrail cover. As with the first embodiment, the second embodiment may alternatively have screw holes provided for additional security. The second embodiment of the present invention, as shown in FIG. 2, would preferably have screw holes on flange 8. In an alternative embodiment, it is also conceived flange 6 could possess screw holes in addition to screw holes flange 8. The widths of flanges 6 and 8 would be sized to accommodate a standard sized deck screw.

Figure 3:
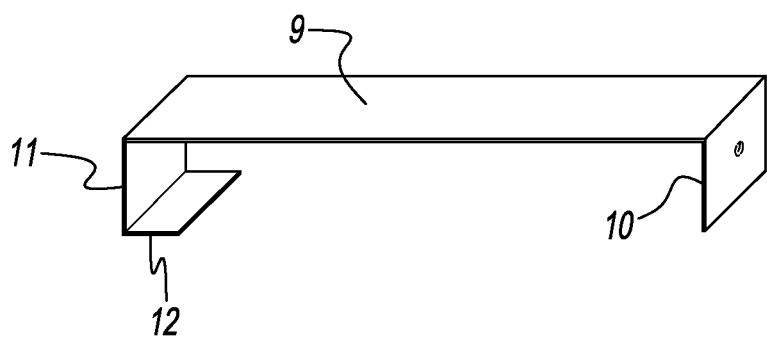
FIG. 3 is a perspective view of the third embodiment of the present invention.

Referring now to FIG. 3, the third embodiment of the present invention is designed to cover a standard 2×6 piece of lumber. The top 9 portion of the third embodiment lays flat up against the wood, as does the side portions 11 and 10. The flange 12 of the third embodiment enables the deck cover to "snap-on" to the pieces of lumber in the same manner as in the first embodiment. The width of flange 12 is sized to prevent a user gripping the handrail from coming in contact with possible splintered wood beneath the plastic handrail cover. As with both the first and second embodiments, the third embodiment may alternatively have screw holes provided for additional security. The third embodiment of the present invention, as shown in FIG. 3, would preferably have screw holes on side portion 10. In an alternative embodiment, it is also conceived flange 12 could possess screw holes in addition to screw holes on side portion 10. The width of flange 12 would be sized to accommodate a standard sized deck screw.

Figure 4:
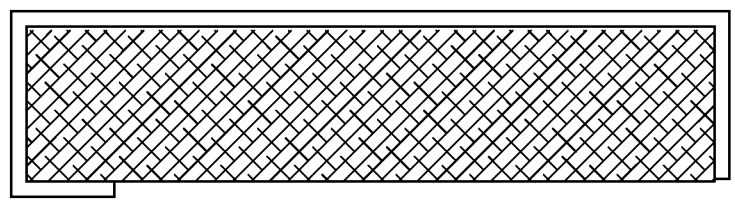
FIG. 4 is a cross-section view of the first embodiment installed on a two by four piece of lumber.

FIG. 4 provides a cross-sectional view of the first embodiment of the present invention installed on standard 2×4 piece of lumber. The present invention lies flush up against the lumber to prevent and reduce the growth of mold on the lumber. The present invention also lies flush to provide a neat and smooth appearance.

Figures 5, 6:
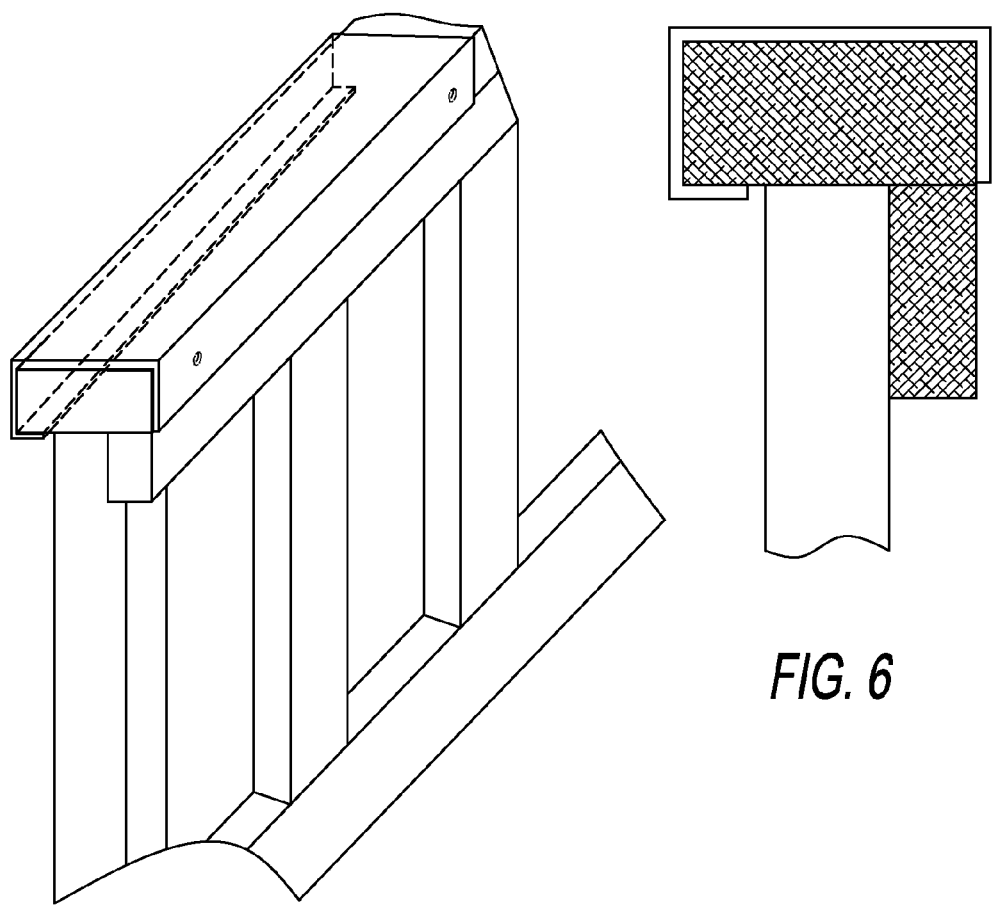
FIG. 5 demonstrates the installation of the first embodiment on a wooden deck handrail.
FIG. 6 is a cross-section view of the first embodiment installed on a wooden deck handrail.

Referring now to FIGS. 5 and 6, a demonstration of how the first embodiment of the present invention would be installed on a wooden deck handrail is shown. FIG. 5 provides a depiction of a typical wooden deck handrail and railing of a deck and the first embodiment of the present invention installed upon the wooden deck handrail portion of the deck. FIG. 6 provides a cross-sectional view of FIG. 5.

Figure 8:
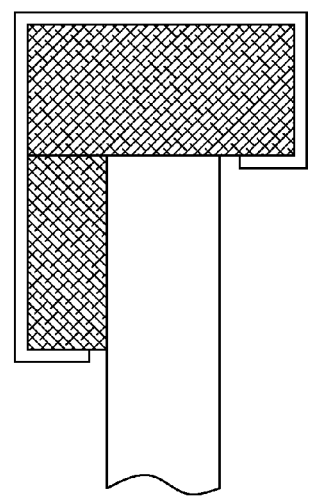
FIG. 8 is a cross-section view of the second embodiment on a wooden deck handrail.

Referring now to FIGS. 7 and 8, a demonstration of how the second embodiment of the present invention would be installed on a wooden deck handrail is shown. FIG. 7 provides a depiction of a typical wooden deck handrail and railing of a deck and the second embodiment of the present invention installed upon the wooden deck handrail portion of the deck. FIG. 8 provides a cross-sectional view of FIG. 7.

The present invention may be produced in various lengths and may be cut to size by an installer to accommodate the specific lengths of the wooden deck handrail. Even though the present invention has been described as covering standard 2×4 and 2×6 pieces of the lumber, the present invention may alternatively be produced in various standard sizes to attach to other common lumber sizes.

The surface of the present invention is preferably smooth. However, the exterior portion of the present invention may employ some texturing, such as wood grain textures. The color of the present invention is preferably white. However, the plastic material of the present invention is composed of may be dyed in various colors to match possible various deck colors.

While one aspect of the present invention is to cover a wooden deck handrail that has begun to deteriorate, it should be realized that a wooden deck handrail that is rotted or otherwise structurally unsound must be replaced prior to the installation of the present invention. Replacement of a rotted wooden deck handrail is necessary, as application of the present invention may not provide the extra strength needed to make the wooden deck handrail structurally sound, particularly if deterioration continues. Therefore, the present invention should only be applied to wooden deck handrails that are suffering from primarily visual deterioration, such as fading, cracking, or splintering, for example.

Although the present invention has been generally described above as applied to a wooden deck in a mildly deteriorated condition, such does not have to be the case. The present invention may also be applied to decks with wooden deck handrails in good condition, thereby eliminating the need for frequent cleaning and staining by obtaining the benefits of a plastic deck at less cost.

The scope of the present invention is not to be considered limited by the above disclosure, and modifications are possible without departing from the spirit of the invention as evidenced by the following claims.

I claim:

1. A handrail cover, comprising:
   a flat top portion which lies flush against a top surface of a handrail, a length of said top portion corresponding to a length of said handrail, said top portion comprising opposing first and second longitudinally extending edges, a width of said top portion between said first and second edges corresponding to a width of said handrail;

a flat first side portion unitarily formed with and extending substantially perpendicularly a first distance from said first edge of said top portion, wherein said first side portion lies flush against a first side surface of said handrail, said first side portion longitudinally extending along said first edge of said top portion and a length of said first side portion corresponding to the length of said handrail, a width of said first side portion and said first distance corresponding to a width of said first side surface of said handrail;

a flat second side portion unitarily formed with and extending substantially perpendicularly a second distance from said second edge of said top portion, wherein said second side portion lies flush against a second side surface of said handrail, said second side portion longitudinally extending along said second edge of said top portion and a length of said second side portion corresponding to the length of said handrail, a width of said second side portion and said second distance corresponding to a width of said second side surface of said handrail, wherein said second distance is smaller than said first distance, wherein said first side portion is substantially parallel to said second side portion;

a flat first flange portion unitarily formed with and extending substantially perpendicularly a third distance from a longitudinally extending edge of said first side portion opposite to and beneath said top portion, wherein said first flange portion lies flush against a bottom surface of said handrail adjacent said first side surface, said first flange portion longitudinally extending along said longitudinally extending edge of said first side portion and a length of said first flange portion corresponding to the length of said handrail; and a flat second flange portion unitarily formed with and extending substantially perpendicularly said third distance from a longitudinally extending edge of said second side portion opposite to and beneath said top portion, wherein said second flange portion lies flush against a bottom surface of said handrail adjacent said second side surface, said second flange portion longitudinally extending along said longitudinally extending edge of said second side portion and a length of said second flange portion corresponding to the length of said handrail;

said handrail comprising a first longitudinally extending board, a top surface and a width of said first board defining said top surface of said handrail and corresponding to said width of said top portion, and a thickness of said first board corresponding to said second distance and defining said second side surface and a portion of said first side surface of said handrail; and said handrail further comprising a second longitudinally extending board fixed to a bottom surface of said first board, a width of said second board defining a portion of said first side surface of said handrail, a sum of said thickness of said first board and said width of said second board corresponding to said width of said first side portion, and a bottom surface and a thickness of said second board defining said bottom surface of said handrail adjacent said first side surface;

wherein said second flange portion is longitudinally aligned and engaged with a bottom surface of said first board defining said bottom surface of said handrail adjacent said second side surface, and said handrail cover is pivoted toward said handrail such that said first side portion resiliently flexes outwardly to allow said first flange portion to slide over said first side surface of said handrail and to resiliently engage said bottom surface of said second board; and wherein said first flange portion comprises at least one hole for receiving a fastener to secure said handrail cover to said handrail.

2. The handrail cover of claim 1, wherein said handrail cover is formed from a plastic material.

3. The handrail cover of claim 2, wherein said plastic material is polyvinyl chloride.

4. The handrail cover of claim 1, wherein said first distance corresponds to a sum of a thickness and a width of a 2"×4" board and said second distance corresponds to the thickness of the 2"×4" board.

5. The handrail cover of claim 1, wherein the distance between said first edge and said second edge of said top portion corresponds to a width of a 2"×4" board.

6. The handrail cover of claim 1, wherein the distance between said first edge and said second edge of said top portion corresponds to a width of a 2"×6" board.

* * * * *